No. 644,179. Patented Feb. 27, 1900.
D. KLEIN & W. P. SWARTZ.
MILKING APPARATUS.
(Application filed Apr. 18, 1898. Renewed Dec. 26, 1899.)
(No Model.)
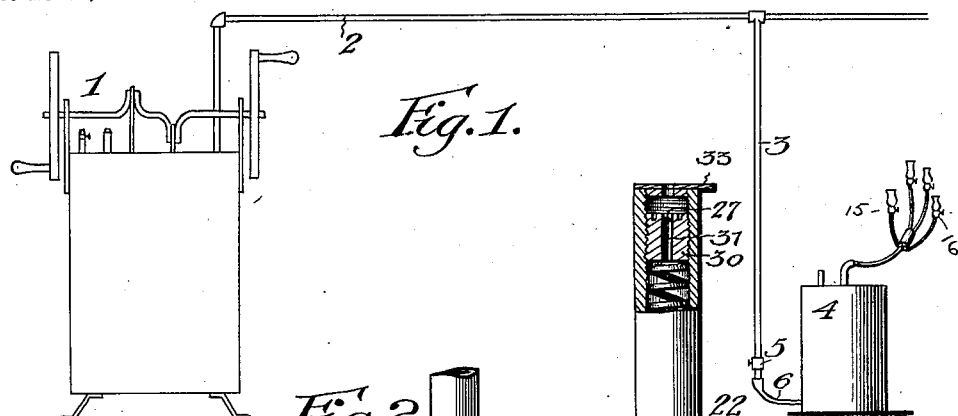
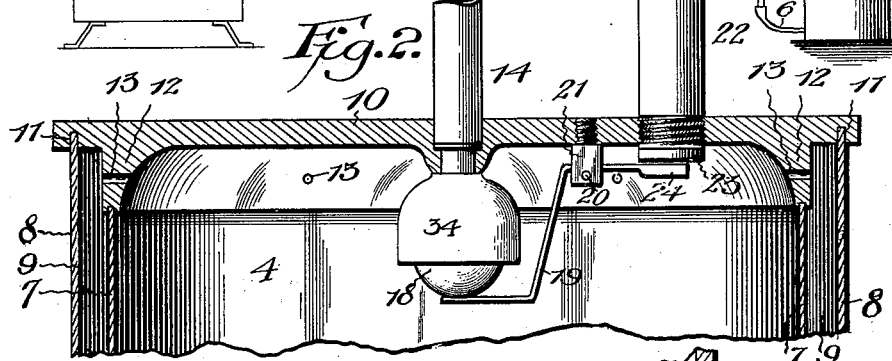
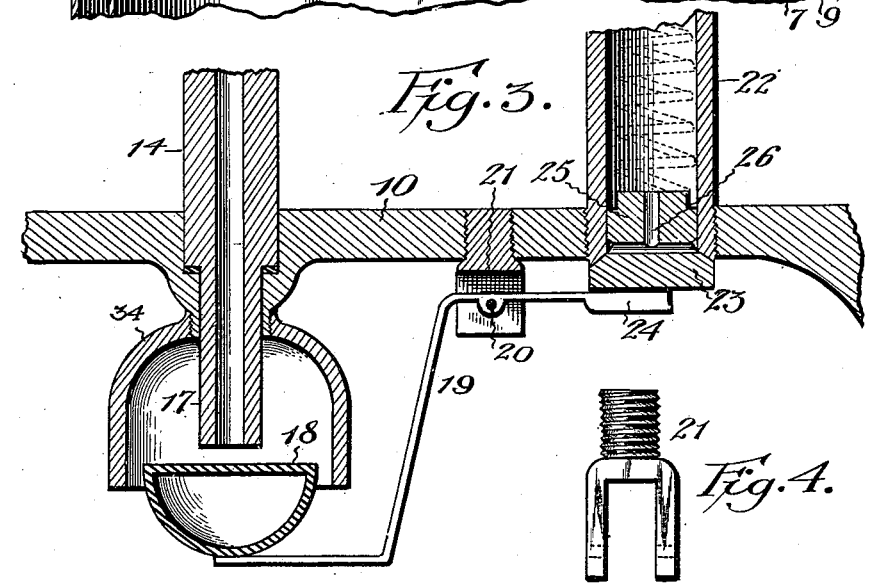
Witnesses
A. Roy Appleman
Daniel Klein, Inventors
William P. Swartz.
By their Attorneys,
C. A. Snow & Co.

UNITED STATES PATENT OFFICE.

DANIEL KLEIN AND WILLIAM P. SWARTZ, OF POUGHKEEPSIE, NEW YORK.

MILKING APPARATUS.

SPECIFICATION forming part of Letters Patent No. 644,179, dated February 27, 1900.

Application filed April 18, 1898. Renewed December 26, 1899. Serial No. 741,676. (No model.)

*To all whom it may concern:*

Be it known that we, DANIEL KLEIN and WILLIAM P. SWARTZ, citizens of the United States, residing at Poughkeepsie, in the county of Dutchess and State of New York, have invented a new and useful Milking Apparatus, of which the following is a specification.

Our invention relates to a milking apparatus, and particularly to an improvement in milk-receptacles of that class shown and described in connection with the milking apparatus disclosed in a former patent, No. 598,423, granted to Daniel Klein on February 1, 1898; and the objects in view are to limit the inflow of milk to the receptacle when the latter is filled to a predetermined level, to check the suction applied by the apparatus to the cow's udder when the flow of milk ceases, and, furthermore, to provide a signaling device whereby the filling of the can and the cessation of the flow of milk, or either, may be audibly indicated.

Further objects and advantages of this invention will appear in the following description, and the novel features thereof will be particularly pointed out in the appended claims.

In the drawings, Figure 1 is a diagrammatic view of a milking apparatus including a receptacle constructed in accordance with our invention. Fig. 2 is a vertical sectional view, partly broken away, of the receptacle, showing the alarm and connected mechanism in elevation. Fig. 3 is a detail sectional view of the alarm and connected mechanism. Fig. 4 is a detail view of the hanger upon which the balanced lever is fulcrumed. Fig. 5 is a detail view of the upper end of the vent-tube or valve-casing to show the vent-controlling slide or vent-closer.

Similar numerals of reference indicate corresponding parts in all the figures of the drawings.

As the exhausting mechanism which may be used in an apparatus of this class for producing the necessary vacuum or partial vacuum in the receptacle may be varied in construction and may be as shown and described in the patent above mentioned, we have deemed it sufficient in connection with our present invention to illustrate the same diagrammatically, as at 1, and from this exhausting mechanism extends a suction-pipe 2, having a suitable number of branches 3, of which one only is illustrated in the accompanying drawings, for connection with milk-receptacles 4, said branch being provided with a controlling-valve 5, and connection between the branch and the receptacle being accomplished by means of a flexible tube-section 6.

The milk-receptacle consists of an inner cylindrical receiver 7, inclosed within an outer case 8, with an intervening space, forming a vacuum-chamber 9, substantially as set forth in the patent above mentioned, the exhausting mechanism having connection with the said intermediate vacuum-chamber. This receptacle is fitted with a removable lid 10, having an annular groove 11, preferably fitted with packing, to receive the upper edge of the case 8, and is also provided with a depending annular rim 12, grooved at its lower edge to receive the upper edge of the receiver-wall 7. This rim is provided with ports or openings 13 to establish communication between the vacuum-chamber and the receiver, whereby the air may be exhausted from the interior of the latter.

Communicating with the receiver is a milk-conveyer 14, also constructed, substantially as shown and described in the patent above mentioned, with a plurality of attached teat-cups 15, which are valved, as shown, at 16. The conveyer 14 extends through an opening in the milk-receptacle cover and terminates in a nozzle 17, designed to discharge inflowing milk upon a controller 18, upheld by a support consisting in the construction illustrated of a balanced lever 19, fulcrumed by means of a transverse pin 20 in a bifurcated hanger 21, depending from the receptacle-cover. Also communicating with the interior of the receiver is a vent-tube 22, designed to admit air to destroy any existing vacuum when the liquid contents of the can have reached a predetermined level or when the flow of liquid through the conveyer 14 ceases. This vent is fitted with a valve 23, preferably seated at the inner end thereof and engaged by an arm of the pressure-plate support 19. In practice the lever 19 is balanced, as above indicated, the weight of the controller 18 being counterbalanced by an enlargement or weight 24, whereby of itself said lever will have no tendency to either open or close the valve 23. The valve is constructed with a plug or slide 25, fitted in the bore of the vent-tube and channeled, as shown at 26, and in the vent-tube, preferably at its upper end, is arranged a whistle 27. The impact of the inflowing liquid through the conveyer 14 is relied upon, in part, to maintain the vent and alarm-controlling valve seated; but we have found in practice that in order to avoid injurious suction as applied to the animal and insure the prompt release of the suction under certain conditions, as when the flow of liquid ceases, it is necessary to delicately balance the lever 19; but as the impact of the inflowing liquid is of comparatively-slight stress, and hence is incapable of resisting the tendency of the vacuum within the receptacle to unseat the valve, we preferably employ, in connection with the valve, a seating-spring 28 in the cylinder 22 and attached at its lower end to the valve. Any suitable means for varying the tension of this spring may be employed; but in the drawings we have illustrated a practical equivalent of that shown and described in the patent of Daniel Klein, above mentioned, said means consisting of an adjusting-plug 30, threaded in the cylinder or casing and provided with a channel 31. In the upper end of the valve casing or cylinder 22 is arranged the whistle or air-affected alarm device 27, and in operative relation therewith and designed to close the orifice thereof we have illustrated the vent-closer 33, consisting of a slide or the equivalent thereof.

As thus far described the apparatus is adapted to work as follows: The tension-spring of the valve 23 is adjusted so that it is slightly less than that necessary to maintain the valve seated in opposition to the opening effect of the atmospheric pressure upon the valve, due to a partial vacuum, at the desired approach to perfection within the receptacle. In other words, assuming that the partial vacuum which is to be produced within the receptacle will cause an opening pressure upon the valve of twelve pounds to the square inch, the tension of the spring is adjusted to exert an opposing or closing pressure of slightly less than twelve pounds, whereby the impact of inflowing liquid through the conveyer 14 upon the controller 18 will make up the difference between the tension of the spring and the atmospheric pressure upon the valve, and thus will maintain the valve seated in opposition to suction, due to the partial vacuum within the receptacle. A vacuum or partial vacuum having been produced in the tank or other vessel forming a part of the exhausting apparatus, and hence having likewise been formed in the conductors and the receptacle, the inlet of the valve-casing having been closed by means of the vent-closer 33, the teat-cups are adjusted and the valves are opened to communicate the suction to the cups, whereupon the liquid, flowing through the conveyer 14 and applied more or less forcibly to the controller 18, will depress the supporting end of the lever 19 and bring the other end of said lever into operative engagement with the valve 23. Obviously the vent-closer is adjusted to exclude atmospheric pressure in order that the desired extent of vacuum may be produced in the receptacle; but as soon as the liquid begins to flow through the conveyer 14 and the lever is thrown to its operative position with its weighted arm in contact with the valve, to make up the difference between the tension of the spring and the atmospheric pressure upon the valve, the slide forming the vent-closer may be opened. The parts remain in the described relative positions as long as the inflow of liquid through the conveyer continues; but in case of the cessation of flow due to the stripping of the udder the pressure-plate will be free to rise, owing to the balanced construction of the lever by which it is supported, and hence the lever will release the valve 23 and allow the latter to be unseated by the excess of atmospheric pressure upon the valve over the opposing tension of the seating-spring. Obviously the unseating of the valve allows an influx of air through the vent to relieve the suction in the teat-cups (to prevent injury to the animal) and also causes the sounding of the alarm, which apprises the attendant that operation, so far as that receptacle is concerned, has ceased.

It is obvious that the employment of the seating-spring provides for the adjustment of the parts to apply a suction of the desired intensity to the teat-cups and to vary the amount of suction in the teat-cups which are connected with different receptacles to suit the different animals in connection with which the apparatus is used; but that while the tension-spring is desirable in order to secure this adjustment and in order to enable the lever 19 to be actuated by the comparatively-slight force of the inflowing liquid it is the lever in each case which holds the valve seated during the continuance of the milking operation, and that an excess of suction within the receptacle will counteract the effect of the impact of liquid upon the controller and will cause the unseating of the valve 23 to relieve that pressure until it returns to normal or to that pressure which has been decided upon as that which is necessary to properly perform the operation. In other words, the valve 23 acts in the capacity of a safety-valve to maintain a uniform pressure within the receptacle. It will be understood, furthermore, that the operative connection between the balanced lever and the valve in the construction illustrated involves simply the arrangement of one arm of the lever in the path of the opening movement of the valve, whereby when the lever assumes its normal position it is out of contact with the valve; but it will be understood that any analogous connection between the lever and the valve, whereby the depression of the controller end of the lever will cause the seating of the valve in opposition to the desired atmospheric pressure applied to the valve, may be adopted without departing from the spirit of the invention. It is desirable, however, to provide reliable means for checking the inflow of liquid when the receptacle has become filled to a predetermined point in order to prevent overflow, and by a slight variation in the construction of the controller it is possible to cause the apparatus above described to perform both functions. In other words, by employing a controller or constructing the pressure-plate as a float, located at such a point in the receptacle as to be below the upper edge of the receiver 7, it will be seen that when the level of the contents of the receptacle reach the controller the latter will be raised in opposition to the pressure applied by the stream of inflowing milk, and hence the valve will be released as above described. In the construction illustrated the controller consists of a hollow, preferably semispherical, object constructed of gutta-percha or any equivalent thereof, its upper surface being designed for the impact and shed of the inflowing liquid, and in order that the splashing of the liquid as it strikes the shedding-surface of the controller may not cause the deposit thereof upon the under surface of the cover and the parts of the controlling and alarm mechanism we preferably affix a hood or bell-shaped deflector 34 to the conveyer 14 and surrounding the lower end or nozzle of said conveyer, as well as the upper portion of the float. Any splashing of the liquid within this hood or deflector will not affect the other parts of the mechanism, and hence it will be caused to drop quietly into the receiver. It will be readily understood, therefore, from the foregoing description that after the parts of the apparatus have been adjusted for operation either the cessation of the flow of liquid or the filling of the receiver will be indicated audibly to the attendant, whereby the receptacle may be removed or emptied according to the requirements; and it will be understood, furthermore, while the construction described is well adapted for performing the several functions indicated that various changes in the form, proportion, and the minor details of construction may be resorted to without departing from the spirit or sacrificing any of the advantages of this invention.

An important feature of the construction disclosed consists in the controller having a liquid-shedding surface which is arranged in the path of liquid entering the receptacle, as distinguished from those devices wherein a tilting or depressible cup or pan is employed for receiving a portion of the inflow to maintain said cup or pan in a depressed position during the operation of milking. We have found in practice that a controller having a shedding-surface from which the liquid flows as rapidly as it comes in contact therewith the apparatus may be adjusted to operate with more delicacy and with better results. When the flow of milk ceases, suction correspondingly ceases, whereas when the cessation of the suction depends upon the return of a cup or pan to its normal or elevated position, said cup or pan being relieved by a drip or by a time-outlet, the suction continues for a considerable length of time after the necessity therefor has ceased. Furthermore, in the construction shown and described the controller having the liquid-shedding surface is of such nature that should the vessel become filled the valve which controls the suction will be closed, even should the flow of liquid be continuous, for the reason that the buoyancy of the float will cause it to rise, and thus close the suction-pipe, in opposition to the impact of the incoming liquid. This arrangement of parts provides for an operation which is prompt and satisfactory in a device of this class, and the stock is relieved from the effect of the suction within the receptacle as soon as the necessity for such suction ceases.

Having described our invention, what we claim is—

1. In a milking apparatus, the combination with a receptacle, and means for exhausting the same, a liquid-inflow conveyer communicating with the receptacle, and an alarm mechanism, of a movable counterbalanced controller having a liquid-shedding surface arranged in the path of inflow of liquid through said conveyer, and means, actuated by said impact element, for controlling the alarm mechanism, substantially as specified.

2. In a milking apparatus, the combination with a receptacle, and means for exhausting the same, a liquid-inflow conveyer communicating with the receptacle, and an alarm mechanism, of a movable counterbalanced controller having a liquid-shedding surface arranged in the path of inflow of liquid through said conveyer, and means, actuated by said impact element, for controlling the alarm mechanism, substantially as specified.

3. In a milking apparatus, the combination with a receptacle, and means for exhausting the same, a liquid-inflow conveyer communicating with the receptacle, and an alarm mechanism, of a movable counterbalanced controller having a flat liquid-shedding upper surface, arranged in the path of inflow of liquid through said conveyer, and means, actuated by said impact element, for controlling the alarm mechanism, substantially as specified.

4. In a milking apparatus, the combination with a receptacle, and means for exhausting the same, a liquid-inflow conveyer, and an alarm mechanism consisting of an exhaust-actuated whistle, of a movable counterbalanced controller having a liquid-shedding surface arranged in the path of liquid admitted through said conveyer, and means actuated by said impact element for controlling communication between the whistle and the receptacle, substantially as specified.

5. In a milking apparatus, the combination with a receptacle, and means for exhausting the same, the receptacle having a vent, a liquid-inflow conveyer in communication with the receptacle, and a signaling device consisting of an exhaust-actuated whistle in communication with said vent, of a movable counterbalanced controller having a liquid-shedding surface arranged in the path of liquid admitted to said conveyer, and a valve, actuated by said element and controlling said vent, substantially as specified.

6. In a milking apparatus, the combination with a receptacle, and means for exhausting the same, said receptacle having a vent, a liquid-inflow conveyer communicating with the receptacle, and an air-actuated signaling device in communication with said vent, of a movable counterbalanced controller having a liquid-shedding surface arranged in the path of liquid admitted through said conveyer, a valve for said vent, and a lever actuated by said impact element for communicating closing motion to the valve, substantially as specified.

7. In a milking apparatus, the combination with a receptacle, and means for exhausting the same, a liquid-inflow conveyer, and an alarm mechanism, of a movable buoyant controller having a liquid-shedding surface arranged in the path of liquid admitted through said conveyer, and adapted to be raised by the surface of the liquid in the receptacle, and means actuated by said impact element for controlling the alarm mechanism, substantially as specified.

8. In a milking apparatus, the combination with a receptacle, and means for exhausting the same, said receptacle also having a vent, a liquid-inflow conveyer, and an air-actuated alarm mechanism in communication with said vent, of a movable buoyant controller having a liquid-shedding surface arranged in the path of liquid admitted through said conveyer, and adapted to be moved by the surface of liquid in the receptacle, and a valve, actuated by said impact element, for controlling said vent, substantially as specified.

9. In a milking apparatus, the combination with a receptacle, and means for exhausting the same, a liquid-inflow conveyer, and an alarm mechanism, of a controller having a liquid-shedding surface arranged in the path of, and movable in one direction by, the liquid admitted through said conveyer, and movable in the opposite direction by the rise of liquid in the receptacle, and means, actuated by said impact element, for controlling the alarm mechanism, substantially as specified.

10. In a milking apparatus, the combination with a receptacle, and means for exhausting the same, said receptacle having a vent, and a liquid-inflow conveyer, of a movable controller having a liquid-shedding surface arranged in the path of liquid admitted through said conveyer, a hood or deflector within which the impact-surface of said impact element is arranged in all of its positions, and means actuated by the impact element for controlling said vent, substantially as specified.

11. In a milking apparatus, the combination with a receptacle, and means for exhausting the same, said receptacle having a vent, and a liquid-inflow conveyer, of a controller having a liquid-shedding surface adapted to close said inflow-conveyer, and arranged in the path of liquid admitted therethrough, and means actuated by said float for controlling said vent, substantially as specified.

12. In a milking apparatus, the combination with a receptacle, and means for exhausting the same, said receptacle having a vent, and a liquid-inflow conveyer having a nozzle extended within the receptacle, of a controller having a liquid-shedding surface, adapted to be seated upon and close said nozzle, and arranged in the path of liquid admitted thereto, a hood or deflector attached to the nozzle and surrounding said float and the discharge end of the nozzle, and means actuated by the float for controlling said vent, substantially as specified.

13. In a milking apparatus, the combination with a receptacle, and means for exhausting the interior thereof, of a liquid-conveyer having a nozzle extended within the receptacle, a valved vent, a lever operatively connected with the valve of the vent, a nozzle-closing controller carried by the lever and arranged in the path of liquid introduced by said nozzle, and a hood or deflector attached to the nozzle and surrounding the discharge end thereof and the float, substantially as specified.

14. In a milking apparatus, the combination with a milk-receptacle having a vent, and being in communication with air-exhausting mechanism, and an inflow-conveyer communicating with the receptacle, of a valve for controlling said vent, a balanced lever arranged in operative relation with said valve and normally arranged out of contact therewith, and a buoyant controller having a liquid-shedding surface and carried by said lever for actuating the same, and disposed in the path of the inflow of liquid through said conveyer for depression by the liquid, substantially as specified.

15. In a milking apparatus, the combination with a milk-receptacle having a vent, and being connected with air-exhausting mechanism, and a downwardly-discharging liquid-inflow conveyer communicating with the receptacle, of a valve for controlling said vent, a buoyant counterbalanced controller having a liquid-shedding surface arranged beneath the discharge end of the inflow-conveyer, to receive the downward impact and weight of the liquid introduced into the receptacle, and connections between said impact element and the valve, whereby the depression of the former causes the seating of the latter, substantially as specified.

16. In a milking apparatus, the combination with a receptacle having a liquid-conveyer and means for exhausting the interior of the receptacle, of a vent having an inwardly-opening valve, a seating-spring connected with the valve and having a tension slightly less than that necessary to seat the valve in opposition to atmospheric pressure, a controller having a liquid-shedding surface arranged in the path of inflowing liquid through the conveyer, and operating connections between the controller and the valve for maintaining the valve seated in opposition to atmospheric pressure, substantially as specified.

17. In a milking apparatus, the combination with a receptacle having a liquid-conveyer and means for exhausting the interior of the receptacle, of a vent having a controlling-valve, a valve-seating spring connected with the valve, and having a tension slightly less than that necessary to seat the valve in opposition to atmospheric pressure, tension-adjusting devices for the spring, a controller having a liquid-shedding surface arranged in the path of inflowing liquid through the conveyer and connections between the controller and the valve for seating the latter in opposition to atmospheric pressure, substantially as specified.

18. In a milking apparatus, the combination with a receptacle having a liquid-conveyer and means for exhausting the interior of the receptacle, of a vent having a controlling-valve, a valve-seating spring connected with the valve and having a tension slightly less than that necessary to seat the valve in opposition to atmospheric pressure, an adjustable vent-closer, a controller having a liquid-shedding surface arranged in the path of inflowing liquid through the conveyer, and connections between the controller and the valve for seating the latter in opposition to atmospheric pressure, substantially as specified.

In testimony that we claim the foregoing as our own we have hereto affixed our signatures in the presence of two witnesses.

DANIEL KLEIN.
WM. P. SWARTZ.

Witnesses:
CAREY FOSTER,
ALICE B. COX.